United States Patent
Lee (10) Patent No.: US 9,440,610 B2
(45) Date of Patent: Sep. 13, 2016

(54) CURTAIN AIRBAG APPARATUS

(71) Applicant: Hyundai Mobis Co., Ltd., Seoul (KR)

(72) Inventor: Jong Seob Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/695,423

(22) Filed: Apr. 24, 2015

(65) Prior Publication Data

US 2016/0107600 A1    Apr. 21, 2016

(30) Foreign Application Priority Data

Oct. 17, 2014  (KR) .................. 10-2014-0141130

(51) Int. Cl.
*B60R 21/232* (2011.01)
*B60R 21/26* (2011.01)
*B60R 21/231* (2011.01)

(52) U.S. Cl.
CPC ............ *B60R 21/232* (2013.01); *B60R 21/26* (2013.01); *B60R 2021/23107* (2013.01)

(58) Field of Classification Search
CPC ................ B60R 21/26; B60R 21/232; B60R 2021/23107
See application file for complete search history.

(56) References Cited

U.S. PATENT DOCUMENTS

| | | | |
|---|---|---|---|
| 4,290,627 A | 9/1981 | Cumming | |
| 5,482,318 A | 1/1996 | Sollars | |
| 6,481,743 B1 | 11/2002 | Tobe et al. | |
| 7,207,594 B2 | 4/2007 | Igawa et al. | |
| 7,513,523 B2 | 4/2009 | Bayley et al. | |
| 7,967,332 B2 * | 6/2011 | Karlsson | B60R 21/214 280/728.2 |
| 8,020,888 B2 * | 9/2011 | Cheal | B60R 21/213 280/729 |
| 8,042,831 B2 | 10/2011 | Hoffman et al. | |
| 8,186,708 B2 | 5/2012 | Zhou et al. | |
| 8,414,021 B2 * | 4/2013 | Tanaka | B60R 21/2334 280/730.2 |
| 8,474,864 B2 * | 7/2013 | Azuma | B60R 21/232 280/730.2 |
| 8,770,617 B2 | 7/2014 | Abele | |
| 8,770,618 B2 * | 7/2014 | Fukawatase | B60R 21/2342 280/729 |
| 9,108,588 B2 | 8/2015 | Fujawatase | |
| 2003/0178831 A1 | 9/2003 | Roberts et al. | |
| 2004/0007857 A1 * | 1/2004 | Sonnenberg | B60R 21/232 280/730.2 |
| 2004/0119270 A1 * | 6/2004 | Gu | B60R 21/232 280/730.2 |
| 2004/0256841 A1 | 12/2004 | Bakhsh et al. | |

(Continued)

FOREIGN PATENT DOCUMENTS

| | | |
|---|---|---|
| JP | 2003-146176 | 5/2003 |
| JP | 2012-96628 | 5/2012 |

(Continued)

OTHER PUBLICATIONS

Kim et al., Curtain Air Bag Device for Rear Passenger Protection in Vehicle, May 2, 2012, KPO, KP 10-2012-0041505 A, Machine Translation of Description.*

(Continued)

*Primary Examiner* — James English
(74) *Attorney, Agent, or Firm* — H.C. Park & Associates, PLC (57) ABSTRACT

Provided is a curtain airbag apparatus that prevents a head of an occupant from being moved forward. To this end, according to the curtain airbag apparatus according to the exemplary embodiment of the present invention, an auxiliary airbag is installed on an outer surface of a curtain airbag in order to prevent the head of the occupant from being moved forward.

13 Claims, 5 Drawing Sheets

(56) References Cited

U.S. PATENT DOCUMENTS

| | | |
|---|---|---|
| 2006/0131847 A1 | 6/2006 | Sato et al. |
| 2006/0249943 A1 | 11/2006 | Bauer et al. |
| 2007/0040361 A1 | 2/2007 | Bayley et al. |
| 2008/0012275 A1* | 1/2008 | Pinsenschaum ...... B60R 21/232 280/730.2 |
| 2008/0079246 A1 | 4/2008 | Dix |
| 2008/0129023 A1 | 6/2008 | Heigl et al. |
| 2010/0032930 A1 | 2/2010 | Yamamura et al. |
| 2010/0219620 A1 | 9/2010 | Jaramillo |
| 2010/0253055 A1 | 10/2010 | Schneider et al. |
| 2011/0079990 A1 | 4/2011 | Cheal et al. |
| 2011/0260436 A1 | 10/2011 | Park et al. |
| 2012/0001409 A1 | 1/2012 | Azuma et al. |
| 2012/0235388 A1 | 9/2012 | Suzuki |
| 2012/0286500 A1 | 11/2012 | Wiik et al. |
| 2013/0001933 A1 | 1/2013 | Umehara |
| 2013/0229002 A1 | 9/2013 | Enders |
| 2014/0042732 A1 | 2/2014 | Taguchi et al. |
| 2014/0091562 A1 | 4/2014 | Sugimoto |
| 2014/0217707 A1 | 8/2014 | Konishi et al. |
| 2014/0217710 A1 | 8/2014 | Fukawatase et al. |
| 2014/0239619 A1 | 8/2014 | Fukawatase et al. |
| 2014/0239620 A1 | 8/2014 | Kawamura et al. |
| 2014/0239621 A1* | 8/2014 | Kawamura ........... B60R 21/213 280/730.2 |
| 2014/0333053 A1 | 11/2014 | Thomas et al. |
| 2015/0084316 A1 | 3/2015 | Okuhara et al. |
| 2015/0145234 A1 | 5/2015 | Wang et al. |
| 2015/0307053 A1 | 10/2015 | Jo |

FOREIGN PATENT DOCUMENTS

| | | |
|---|---|---|
| JP | 2014-15104 | 1/2014 |
| JP | 2014-037159 | 2/2014 |
| JP | 2014-151734 | 8/2014 |
| JP | 2014-166796 | 9/2014 |
| JP | 2014-166798 | 9/2014 |
| KR | 10-2008-0008109 | 1/2008 |
| KR | 10-2012-0041505 | 5/2012 |

OTHER PUBLICATIONS

Non-Final Office Action issued on Jan. 13, 2016, in U.S. Appl. No. 14/695,380.

Non-Final Office Action issued on Jan. 15, 2016, in U.S. Appl. No. 14/694,574.

Non-Final Office Action issued Jan. 22, 2016, in U.S. Appl. No. 14/688,570.

* cited by examiner

CURTAIN AIRBAG APPARATUS

CROSS-REFERENCE TO RELATED APPLICATION

The present application claims priority from and the benefit of Korean Patent Application Number 10-2014-0141130, filed on Oct. 17, 2014, the entire contents of which the application is incorporated herein for all purposes by this reference.

BACKGROUND

1. Field

The present invention relates to a curtain airbag apparatus, and more particularly, to a curtain airbag apparatus that is installed in a vehicle and elongated in a front and rear direction.

2. Discussion of the Background

In general, curtain airbags are installed at left and right sides of a vehicle, respectively. In more detail, the curtain airbags are installed in inner side panels, which are disposed at lateral upper sides of the vehicle, and are elongated in a front and rear direction of the vehicle.

The curtain airbag apparatus includes an inflator which generates gas, and a curtain airbag which is inflated and deployed when gas generated by the inflator flows into the curtain airbag.

The curtain airbag is deployed from the upper side toward the lower side of the vehicle at the time of an accident, and is disposed between a door of the vehicle and the head of an occupant, thereby protecting the head of the occupant.

Additionally, a driver airbag is typically installed in a steering wheel in the vehicle to protect the driver, and a passenger airbag is installed above the glove box disposed in front of the front passenger seat in the vehicle to protect the front passenger.

Typically, the driver airbag and the passenger airbag are deployed when the vehicle is involved in a head-on collision, the curtain airbags are deployed when the vehicle is involved in a broadside collision or a rollover accident, and the driver airbag, the passenger airbag, and the curtain airbags are deployed when the vehicle collides obliquely with an object.

When the vehicle collides with an object as described above, the upper body of the occupant is bent forward by inertial force, and the occupant's head moves forward. In particular, when the vehicle collides obliquely with an object, the occupant's head also moves forward in an oblique manner and can become trapped between the driver airbag and the curtain airbag or trapped between the passenger airbag and the curtain airbag.

The above information disclosed in this Background section is only for enhancement of understanding of the background of the inventive concept, and, therefore, it may contain information that does not form the prior art that is already known in this country to a person of ordinary skill in the art.

SUMMARY

The present invention has been made in an effort to provide a curtain airbag apparatus that prevents a head of an occupant from being moved forward and trapped between the curtain airbag and a driver airbag or a passenger airbag.

Technical problems solved by the present invention are not limited to the aforementioned technical problem, and solutions to other technical problems, which are not mentioned above, may be clearly understood by those skilled in the art from the following descriptions.

An exemplary embodiment of the present invention provides a curtain airbag apparatus including: an inflator which generates gas; a curtain airbag which is inflated when gas generated by the inflator flows into the curtain airbag; and an auxiliary airbag which is inflated when gas generated by the inflator flows into the auxiliary airbag, in which the auxiliary airbag includes an overlapping portion which is disposed on one surface of the curtain airbag, and a gas guide portion which is disposed at an upper side of the curtain airbag and guides gas generated by the inflator to the overlapping portion.

Other detailed matters of the exemplary embodiment are included in the detailed description and the drawings.

According to the curtain airbag apparatus according to the present invention, the overlapping portion of the auxiliary airbag protrudes further toward the interior of the vehicle than the curtain airbag and supports the head of the occupant at the time of a vehicle accident, thereby preventing the head of the occupant from being moved forward and trapped between the curtain airbag and a driver airbag or a passenger airbag.

The curtain airbag and the auxiliary airbag are coupled to the single inflator, and the auxiliary airbag is inflated by directly receiving gas from the inflator, such that the overlapping portion may be quickly inflated, thereby early preventing the head of the occupant from being moved forward and trapped between the curtain airbag and a driver airbag or a passenger airbag.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, a curtain airbag apparatus according to exemplary embodiments of the present invention will be described with reference to the drawings.

Figure 1:
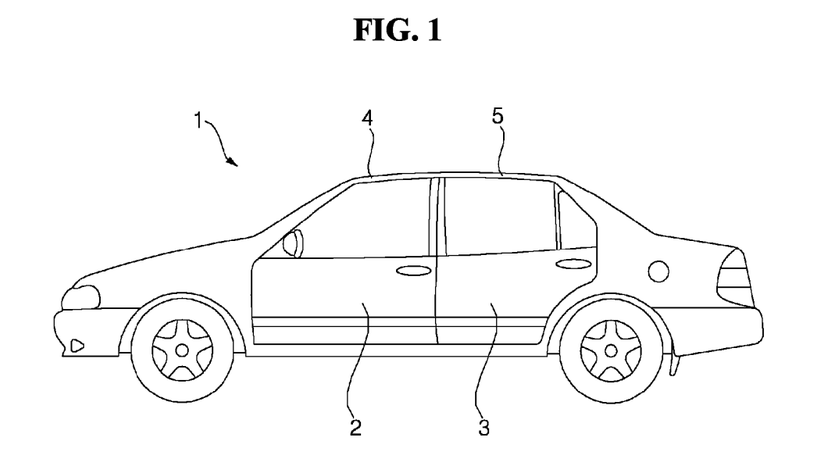
FIG. 1 is a side view illustrating a vehicle in which a curtain airbag apparatus according to a first exemplary embodiment of the present invention is installed.
Figure 2:
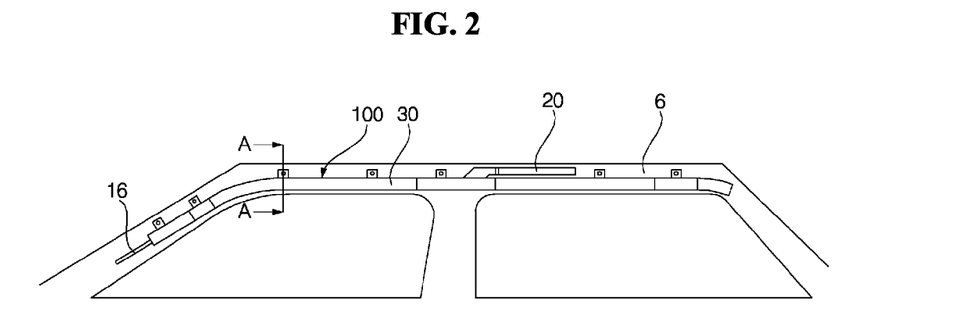
FIG. 2 is a view illustrating a state in which the curtain airbag apparatus according to the first exemplary embodiment of the present invention is installed in the vehicle.
Figure 3:
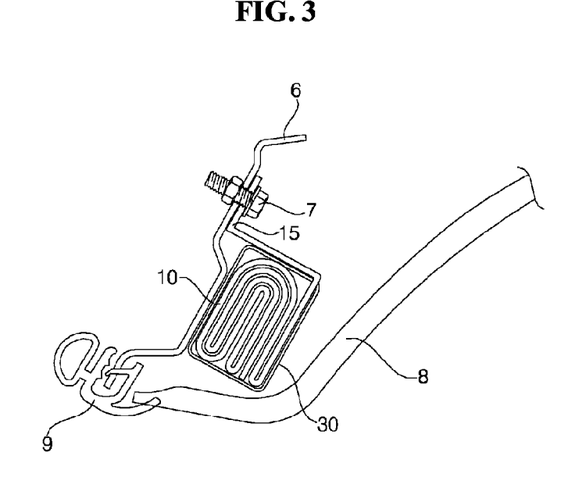
FIG. 3 is a cross-sectional view taken along line A-A of FIG. 2.

FIG. 1 is a side view illustrating a vehicle in which a curtain airbag apparatus according to a first exemplary embodiment of the present invention is installed, and FIG. 2 is a view illustrating a state in which the curtain airbag apparatus according to the first exemplary embodiment of the present invention is installed in the vehicle, and FIG. 3 is a cross-sectional view taken along line A-A of FIG. 2.

Referring to FIG. 1, FIG. 2, and FIG. 3, the curtain airbag apparatus according to the first exemplary embodiment of the present invention is mounted at the upper side of a vehicle 1 and elongated in a front and rear direction.

Front doors 2 and rear doors 3, through which occupants (including both a driver and a passenger) get in and out of the vehicle 1, are provided at lateral sides of the vehicle 1 in an exemplary embodiment, which is not limited thereto and may also include other vehicles such as 2-door coupes, hatchbacks, vans, etc. An A pillar 4 is disposed at the upper side of the front door 2, and a C pillar 5 is disposed at the upper side of the rear door 3, and a B pillar (not illustrated) may be disposed between the front door 2 and the rear door 3 and elongated in an up and down direction.

The curtain airbag apparatus 100 is mounted in an inner side panel 6, which is disposed inside the A pillar 4 and the C pillar 5, and elongated in the front and rear direction.

The curtain airbag apparatus 100 includes an inflator 20 which generates gas, and a curtain airbag 10 which is connected with the inflator 20, and inflated and deployed when gas generated by the inflator 20 flows into the curtain airbag 10, so as to protect the head of the passenger.

The curtain airbag 10 is folded and then encapsulated in an airbag cover 30, and mounted in the inner side panel 6, which is disposed inside of the A pillar 4 and the C pillar 5, by a fastening member 7.

The curtain airbag apparatus 100 is covered by a headliner 8 such that the curtain airbag apparatus 100 is not visible from the interior of the vehicle. Here, the headliner 8 refers to a member which is made of woven or non-woven fabric and covers a roof panel (not illustrated) of the vehicle 1 from the interior of the vehicle 1. The headliner 8 is retained by a weather strip 9 disposed at a lower end of the inner side panel 6, and when the curtain airbag 10 is inflated, the headliner 8 is spread while being detached from the weather strip 9 by expansive force of the curtain airbag 10. The curtain airbag 10 then escapes from an open gap between the weather strip 9 and the headliner 8 and is deployed so as to be disposed between the head of the occupant and the front door 2 and the rear door 3, thereby protecting the head of the occupant.

Figure 4:
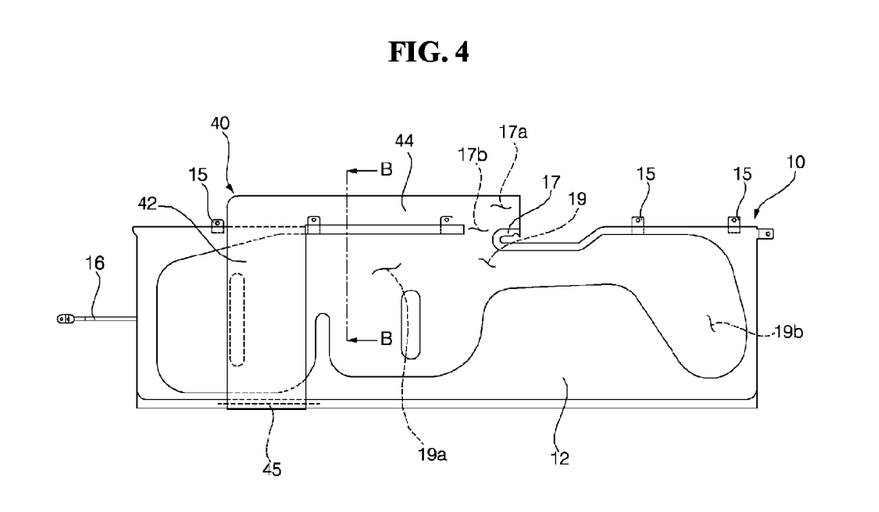
FIG. 4 is a side view illustrating the curtain airbag apparatus according to the first exemplary embodiment of the present invention.
Figure 5:
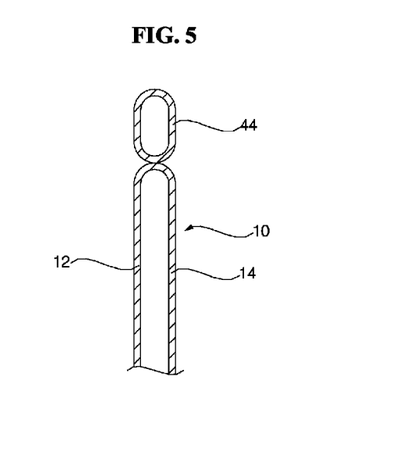
FIG. 5 is a cross-sectional view taken along line B-B of FIG. 4.
Figure 6:
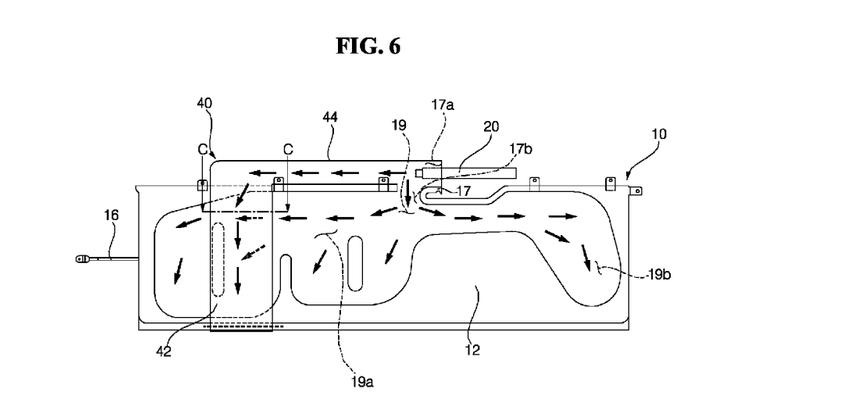
FIG. 6 is a view illustrating an operational state of the curtain airbag apparatus according to the first exemplary embodiment of the present invention.
Figure 7:
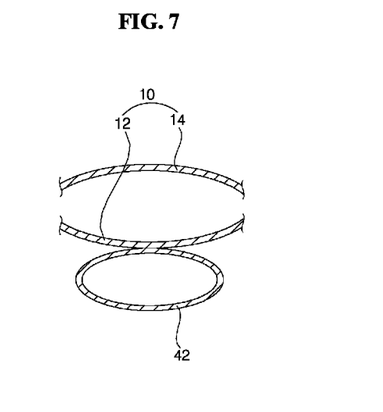
FIG. 7 is a cross-sectional view taken along line C-C of FIG. 6.

FIG. 4 is a side view illustrating the curtain airbag apparatus according to the first exemplary embodiment of the present invention, and FIG. 5 is a cross-sectional view taken along line B-B of FIG. 4, and FIG. 6 is a view illustrating an operational state of the curtain airbag apparatus according to the first exemplary embodiment of the present invention, and FIG. 7 is a cross-sectional view taken along line C-C of FIG. 6.

Referring to FIGS. 4 through 7, a plurality of mounting tabs 15, which are mounted on the inner side panel 6, are formed at the upper side of the curtain airbag 10. The mounting tabs 15 are mounted on the inner side panel 6 by the fastening members 7 illustrated in FIG. 3.

A coupling portion 17, which is coupled to the inflator 20, is formed at an upper central portion of the curtain airbag 10. The curtain airbag 10 is inflated and deployed by gas that is generated by the inflator 20 and flows into a chamber 19 of the curtain airbag 10.

A gas inlet 17b, which guides gas generated by the inflator 20 to the chamber 19 that is an internal space of the curtain airbag 10, is formed at the upper side of the curtain airbag 10. The gas inlet 17b may be disposed at the front side of the inflator 20 rather than the tip of the inflator 20.

An A pillar tether 16, which is fixed to the inner side panel 6 disposed inside the A pillar 4, is coupled to the front side of the curtain airbag 10. Therefore, the front side of the curtain airbag 10 is restricted by the A pillar tether 16 when the curtain airbag 10 is inflated, such that the curtain airbag 10 may be deployed without being tilted rearward.

The curtain airbag 10 may be formed by sewing or otherwise fastening two flexible panels together. That is, the curtain airbag 10 includes a first panel 12 which forms one surface, and a second panel 14 which forms the other surface that is opposite to the first panel 12.

The first panel 12 and the second panel 14 face each other, and then circumferences of the first panel 12 and the second panel 14 are sewn and coupled so as to manufacture the curtain airbag 10. However, the coupling method is not limited thereto and the first and second panels 12 and 14 may alternately be formed as one unit and/or folded and sewn at one end.

Before gas flows into the chamber 19 comprising an internal space between the first panel 12 and the second panel 14, the first panel 12 and the second panel 14 are disposed in a flat state while facing each other. When the curtain airbag 10 is deployed, the first panel 12 is disposed to be directed toward the occupant, and the second panel 14 is disposed to be directed toward the outside of the vehicle 1.

The chamber 19 includes a front chamber 19a which is disposed at the front side based on a center in the front and rear direction of the curtain airbag 10, and a rear chamber 19b which is disposed at the rear side based on the center in the front and rear direction of the curtain airbag 10.

The front chamber 19a defines a region for protecting an occupant seated in a front seat, and the rear chamber 19b defines a region for protecting an occupant seated in a rear seat.

The curtain airbag apparatus according to the first exemplary embodiment of the present invention further includes an auxiliary airbag 40 that is inflated when gas generated by the inflator 20 flows into the auxiliary airbag 40. The auxiliary airbag 40, together with the curtain airbag 10, is coupled to the single inflator 20. Therefore, when the inflator 20 generates gas, the curtain airbag 10 and the auxiliary airbag 40 are inflated together.

Referring to FIG. 6, in particular, the auxiliary airbag 40 is not inflated by gas flowing into the chamber 19 of the curtain airbag 10, but inflated directly by gas flowing into the auxiliary airbag 40 itself, such that the auxiliary airbag 40 is more quickly inflated to protect the occupant than a case in which the auxiliary airbag 40 is inflated indirectly by gas flowing into the chamber 19 of the curtain airbag 10.

The auxiliary airbag 40 includes an overlapping portion 42 which is disposed on an outer surface of the first panel 12 that forms one surface of the curtain airbag 10, and a gas guide portion 44 which guides gas generated by the inflator 20 to the overlapping portion 42 so that the overlapping portion 42 may be inflated.

Since the overlapping portion 42 is disposed on the outer surface of the curtain airbag 10, the overlapping portion 42 protrudes further toward the interior of the vehicle than the curtain airbag 10 when the overlapping portion 42 inflated, thereby supporting the head of the occupant that is moved forward at the time of an accident of the vehicle 1, and preventing the head of the occupant from being moved further forward.

The overlapping portion 42 is disposed to be adjacent to the first panel 12 which forms the front chamber 19a that is a region for protecting the occupant seated in the front seat. Therefore, when the overlapping portion 42 is inflated, the head of the occupant seated in the front seat is supported by the overlapping portion 42 and is not moved further forward. In particular, there is concern that the head of the occupant will be obliquely moved forward when the vehicle 1 obliquely collides with an object, and trapped between a driver airbag (not illustrated) and the curtain airbag 10 or trapped between a passenger airbag (not illustrated) and the curtain airbag 10. However, in the present exemplary embodiment, since the overlapping portion 42 protrudes further toward the interior of the vehicle than the curtain airbag 10 such that the head of the occupant, which is being moved forward, is not moved further forward, and as a result, there is no concern that the head of the occupant will be trapped between the driver airbag and the curtain airbag 10 or trapped between the passenger airbag and the curtain airbag 10.

The overlapping portion 42 is disposed from an upper end to a lower end of the curtain airbag 10, and the gas guide portion 44 is formed to be elongated in the front and rear direction of the curtain airbag 10.

A lower end of the overlapping portion 42 is coupled to the lower end of the curtain airbag 10. The lower end of the overlapping portion 42 may be sewn or otherwise coupled to the lower end of the curtain airbag 10 using a thread 45 or other fastening means. Only the lower end of the overlapping portion 42 is coupled to the curtain airbag 10, an upper end of the overlapping portion 42 extends from the gas guide portion 44, and a portion between the upper end and the lower end of the overlapping portion 42 is disposed while being in contact with the first panel 12 comprising one surface of the curtain airbag 10.

The overlapping portion 42 may be disposed perpendicular to the front and rear direction of the curtain airbag 10. Therefore, the overlapping portion 42 may be disposed to have an angle of 90 degrees relative to the gas guide portion 44 disposed to be elongated in the front and rear direction at the upper side of the curtain airbag 10, such that the overlapping portion 42 is disposed to be elongated in the up and down direction of the curtain airbag 10.

The gas guide portion 44 may be formed integrally with the upper side of the curtain airbag 10. That is, the curtain airbag 10 and the auxiliary airbag 40 may be integrally formed. Of course, in a case in which the auxiliary airbag 40 is formed separately from the curtain airbag 10, the gas guide portion 44 may be coupled to the upper side of the curtain airbag 10 by sewing or other fastening means.

The end of the gas guide portion 44, together with the coupling portion 17 formed at an upper central portion of the curtain airbag 10, forms an insertion port 17a into which the tip of the inflator 20 is inserted, such that the curtain airbag 10 and the auxiliary airbag 40 may be coupled to the single inflator 20. The inflator 20 may be coupled to the curtain airbag 10 and the auxiliary airbag 40 by inserting the tip of the inflator 20 into the insertion port 17a, and thereafter covering an outer circumferential surface, which is formed by the coupling portion 17 and the end of the gas guide portion 44, using a clamp (not illustrated).

The end of the gas guide portion 44 is disposed further rearward than the gas inlet 17b formed in the curtain airbag 10, and coupled to the inflator 20.

The gas inlet 17b formed in the curtain airbag 10 is formed below the gas guide portion 44. Therefore, the gas guide portion 44 is in communication with the gas inlet 17b. Gas discharged from the inflator 20 flows forward through the gas guide portion 44 and flows to the chamber 19 of the curtain airbag 10 through the gas inlet 17b at the same time.

Figure 8:
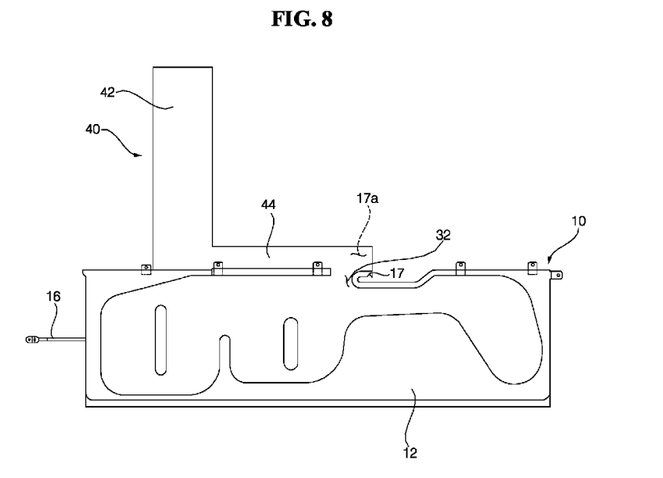
FIGS. 8 and 9 are views illustrating a sequence of manufacturing the curtain airbag apparatus according to the first exemplary embodiment of the present invention.
Figure 9:
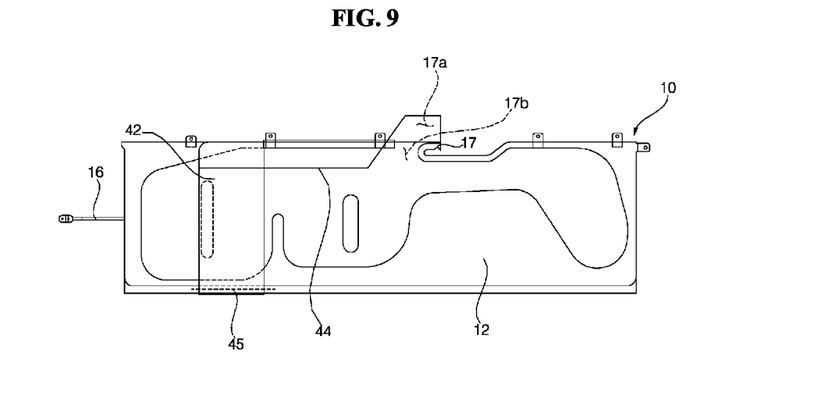

FIGS. 8 and 9 are views illustrating a sequence of manufacturing the curtain airbag apparatus according to the first exemplary embodiment of the present invention.

Referring to FIGS. 4, 8, and 9, the curtain airbag apparatus according to the first exemplary embodiment of the present invention is manufactured from the state as illustrated in FIG. 8 to the state as illustrated in FIG. 4, and thereafter, the curtain airbag apparatus is in the state as illustrated in FIG. 9 before the curtain airbag 10 is folded to be encapsulated in the airbag cover 30.

In more detail, as illustrated in FIG. 8, the lower end of the gas guide portion 44 is formed integrally with the upper end of the curtain airbag 10. In this state, the gas guide portion 44 is folded downward. In this case, the overlapping portion 42 is folded to be in direct contact with the first panel 12 of the curtain airbag 10, and then is sewn on and coupled to the lower end of the curtain airbag 10 using the thread 45, and as a result the curtain airbag 10 in the state as illustrated in FIG. 4 is formed.

Thereafter, the gas guide portion 44 is folded downward as illustrated in FIG. 9. In this case, the gas guide portion 44 may be folded to be in direct contact with the first panel 12 of the curtain airbag 10, or may be folded to be in direct contact with the second panel 14 of the curtain airbag 10.

Thereafter, the curtain airbag 10 may be folded several times and then encapsulated in the airbag cover 30.

Figure 10:
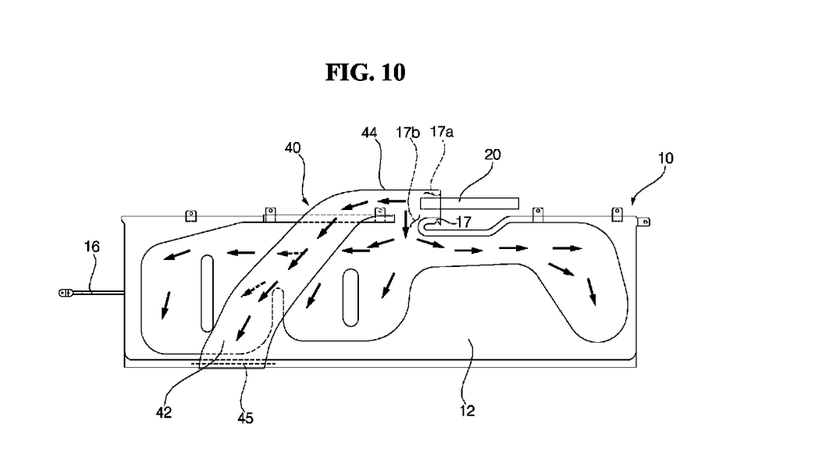
FIG. 10 is a view illustrating an operational state of a curtain airbag apparatus according to a second exemplary embodiment of the present invention.

FIG. 10 is a view illustrating an operational state of a curtain airbag apparatus according to a second exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 10, it can be seen that the curtain airbag apparatus according to the second exemplary embodiment of the present invention differs from the curtain airbag apparatus illustrated in FIG. 6.

That is, in the aforementioned first exemplary embodiment, the overlapping portion 42 and the gas guide portion 44 are disposed at an angle of 90 degrees, such that the overlapping portion 42 is disposed perpendicular to the front and rear direction of the curtain airbag 10, and the gas guide portion 44 is disposed at the upper side of the curtain airbag 10 and elongated in the front and rear direction.

However, in the present second exemplary embodiment, the overlapping portion 42 is disposed at an incline relative to the front and rear direction of the curtain airbag 10, and the gas guide portion 44 is disposed at the upper side of the curtain airbag 10 and elongated in the front and rear direction. However, the gas guide portion 44 is shorter in length in the front and rear direction than the gas guide portion 44 in the aforementioned first exemplary embodiment.

When the overlapping portion 42 is disposed at an incline relative to the front and rear direction of the curtain airbag 10 as described above, the upper end of the overlapping portion 42 is disposed further rearward than the lower end of the overlapping portion 42. Therefore, the upper end of the overlapping portion 42 is disposed to be closer to the front seat than the lower end of the overlapping portion 42. Of course, the overlapping portion 42 may be disposed at an incline relative to the front and rear direction of the curtain airbag 10 so that the upper end of the overlapping portion 42 is disposed further forward than the lower end of the overlapping portion 42.

As described above, in the curtain airbag apparatus according to the second exemplary embodiment of the present invention, the overlapping portion 42 is disposed at an incline relative to the front and rear direction of the curtain airbag 10, such that a point of time at which the head of the occupant comes into contact with the overlapping portion 42 may be changed in accordance with a height of the occupant seated in the front seat.

As described above, according to the curtain airbag apparatus 100 according to the present invention, the overlapping portion 42 of the auxiliary airbag 40 protrudes further toward the interior of the vehicle than the curtain airbag 10 and supports the head of the occupant at the time of an accident of the vehicle 1, thereby preventing the head of the occupant from being moved forward.

The curtain airbag 10 and the auxiliary airbag 40 are coupled to the single inflator 20, and the auxiliary airbag 40 is inflated by directly receiving gas from the inflator 20, such that the overlapping portion 42 may be quickly inflated, thereby early preventing the head of the occupant from being moved forward.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. A curtain airbag apparatus, comprising:
    an inflator configured to generate gas;
    a curtain airbag coupled to the inflator and configured to inflate when gas generated by the inflator flows into the curtain airbag; and
    an auxiliary airbag coupled to the inflator and configured to inflate when gas generated by the inflator flows into the auxiliary airbag,
    wherein the auxiliary airbag comprises:
    an overlapping portion disposed on one surface of the curtain airbag; and
    a gas guide portion disposed at an upper outer side of the curtain airbag and configured to guide gas directly from the inflator to the overlapping portion and not to the curtain airbag;
    wherein the overlapping portion is disposed from an upper end to a lower end of the curtain airbag, and the gas guide portion is formed to be elongated in a front and rear direction of the curtain airbag.

2. The curtain airbag apparatus of claim 1, wherein the overlapping portion is coupled to the lower end of the curtain airbag, and the gas guide portion is formed integrally with an upper side of the curtain airbag.

3. The curtain airbag apparatus of claim 1, wherein the overlapping portion is coupled to the lower end of the curtain airbag, and the gas guide portion is coupled to an upper side of the curtain airbag.

4. The curtain airbag apparatus of claim 1, wherein the curtain airbag further comprises:
 a coupling portion coupled to the inflator; and
 an end of the gas guide portion,
  wherein the coupling portion and end of the gas guide portion form an insertion port into which a tip of the inflator is inserted.

5. The curtain airbag apparatus of claim 1, wherein the overlapping portion is disposed perpendicular to a front and rear direction of the curtain airbag.

6. The curtain airbag apparatus of claim 1, wherein the overlapping portion is disposed at an incline relative to a front and rear direction of the curtain airbag.

7. The curtain airbag apparatus of claim 1, wherein the overlapping portion is disposed at a front side based on a center in a front and rear direction of the curtain airbag.

8. The curtain airbag apparatus of claim 1, wherein a gas inlet, which is configured to guide gas generated by the inflator to an internal space, is formed at an upper side of the curtain airbag, and the gas guide portion is in communication with the gas inlet.

9. The curtain airbag apparatus of claim 8, wherein an end of the gas guide portion is disposed further rearward than the gas inlet.

10. A curtain airbag apparatus, comprising:
 an inflator;
 a curtain airbag connected to the inflator; and
 an auxiliary airbag coupled to the curtain airbag;
 wherein:
 the auxiliary airbag is connected directly to the inflator with the curtain airbag and is configured to protrude toward an interior of a vehicle when gas from the inflator flows thereinto;
 the auxiliary airbag comprises:
 a gas guide portion connected to the inflator and disposed at an upper outer side of the curtain airbag; and
 an overlapping portion connected to the gas guide portion and configured to protrude toward the interior of the vehicle when gas from the inflator flows thereinto; and the gas guide portion is configured to guide gas directly from the inflator to the overlapping portion and not to the curtain airbag; wherein the overlapping portion is disposed from an upper end to a lower end of the curtain airbag, and the gas guide portion is formed to be elongated in a front and rear direction of the curtain airbag.

11. The curtain airbag apparatus of claim 10, wherein the gas guide portion is formed integrally with an upper side of the curtain airbag.

12. The curtain airbag apparatus of claim 10, wherein the lower end of the overlapping portion is coupled to the curtain airbag.

13. The curtain airbag apparatus of claim 10, further comprising a gas inlet configured to guide gas into the gas guide portion and the curtain airbag at the same time.

* * * * *